Oct. 21, 1941.  R. G. OSBORNE  2,259,830
BEATER FOR FIBER PLANT STOCK
Filed April 24, 1940   2 Sheets-Sheet 1

Raymond G. Osborne
INVENTOR.

Oct. 21, 1941.   R. G. OSBORNE   2,259,830
BEATER FOR FIBER PLANT STOCK
Filed April 24, 1940   2 Sheets-Sheet 2
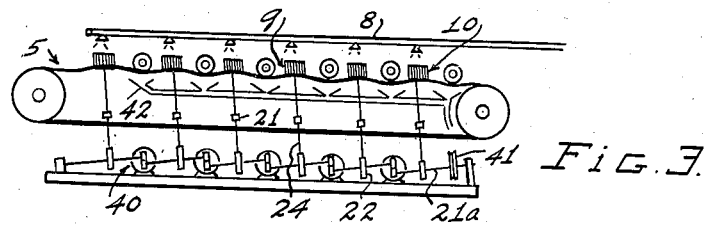
Fig. 3.
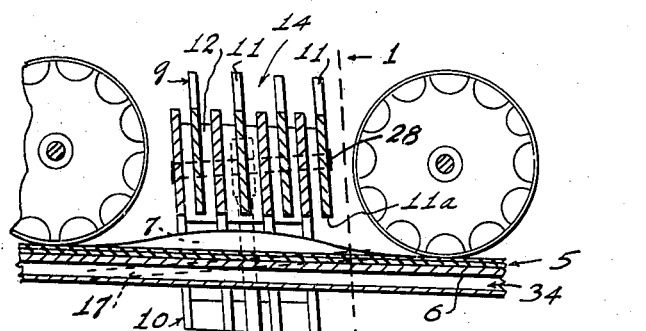
Fig. 2.
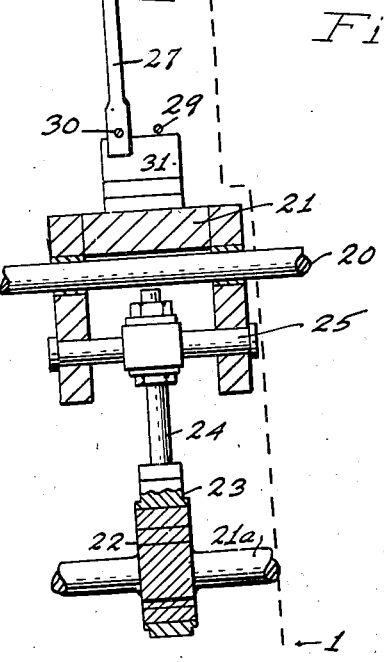
Raymond G. Osborne.
INVENTOR.

Patented Oct. 21, 1941

2,259,830

UNITED STATES PATENT OFFICE 2,259,830

BEATER FOR FIBER PLANT STOCK

Raymond G. Osborne, Los Angeles, Calif.

Application April 24, 1940, Serial No. 331,379

8 Claims. (Cl. 19—7)

My invention relates to the treatment of fiber plants more particularly varieties of Yucca, and concerns a device and method for removal of sugar, saponin, plant cells and the like, altho the beating machine peculiar to this invention will be found to be useful in other processes.

A particular object of this invention is the provision of a beater or beating machine which operates to efficiently clean long fibers without being destructive.

Another object of the invention is to provide a beater particularly adapted for beating fiber while same is being supplied with a limited flow or spray of water so that while the fibers are not actually submerged the action of the beater is such that the fibers are very thoroughly washed to an extent that after slight drying they are at once ready for any final treatment such as carding or direct fabrication into cordage.

Fibers of the Yucca variety are peculiar in that after being subjected to a treatment which promotes partial separation from plant cells, saponin and the like, the material still contains enough saponin to cause objectionable foam where beating or scutching is carried out by old wet methods. It is an object of this invention to provide a beater the efficiency of which is not interfered with by the foam forming characteristics of Yucca.

I have found that Yucca leaves may be subjected to steam or water of suitable pressure while the leaves retain their general shape and that the product of such treatment are masses of fiber still in the same general longitudinal arrangement in which they existed in the original leaf, altho now largely denuded of plant cells and saponin. It is an object of the invention to provide a machine adapted to feed these fibers, so disposed, to beaters which while acting to materially agitate the fibers in the presence of a limited flow of water, do not act to disturb the general arrangement, all whereby the product is one which is readily dried and carded. In fact, a particular object of the invention is to subject the fibers to the action of what might be called blunt-edge paddles, much as has heretofore been done by native labor and crude methods, but at the rate of several thousand well applied blows per minute, and by such action that the fibers do not tend to raise or be lifted materially from the platen or like surface on which they repose during the beating operation.

Another object of the invention has to do with the manner in which the fibers are struck by the paddles. I find that if the blow is positive, as results from the use of positively reciprocated members common to many beating machines, the action is too severe and the fibers may be crushed or broken. It is an object of this invention that the paddles shall undergo what may be termed a whipping action whereby during the latter part of the interval when a paddle edge is moving to strike a mass of fiber a retrograde or retracting force is then being yieldably applied so that the actual blow of the paddle edge is resilient and is followed immediately by a retrograde motion. Also the invention provides, and it is an object of the invention to provide, that as some paddle edges are moving away from the mass of fibers others are approaching it, and all paddles move in a limited space so that while the fibers are constantly beaten and thoroughly agitated in the presence of water, they tend to remain in the same general relative disposition which they normally assume when at rest.

Another and important object of the invention is to provide a high speed highly efficient and flexible beater of the class described in which the usual inertia forces act always to advantage rather than being a disadvantage and a limiting factor as they usually are in ordinary reciprocating machines.

Still another object of the invention is to provide a machine of the class described which altho operating at high reciprocal speed may be operated at any one of a very wide range of speeds so that the machine operations may be adjusted according to the nature of the fiber, and according to the rate at which the machine is fed with fiber, to produce the most effective and efficient action with the minimum breaking of fiber.

Many other objects and advantages will appear hereinafter, including a novel arrangement or disposition of the paddles or beating elements whereby they tend in one case to feed the fibers forwardly and in another case to prevent the mass of fibers from being spread out into too thin a mass.

The accompanying drawings illustrate one practical embodiment of my invention altho other forms of my invention may be used and the drawings are in no way to be construed as limiting the invention to the embodiment illustrated.

Figure 1 of the drawings is a vertical sectional view seen on line 1—1 of Figure 2.

Figure 2 is a sectional view seen on line 2—2 of Figure 1.

Figure 3 is a view in elevation schematically showing several beater units combined.

Figure 1:
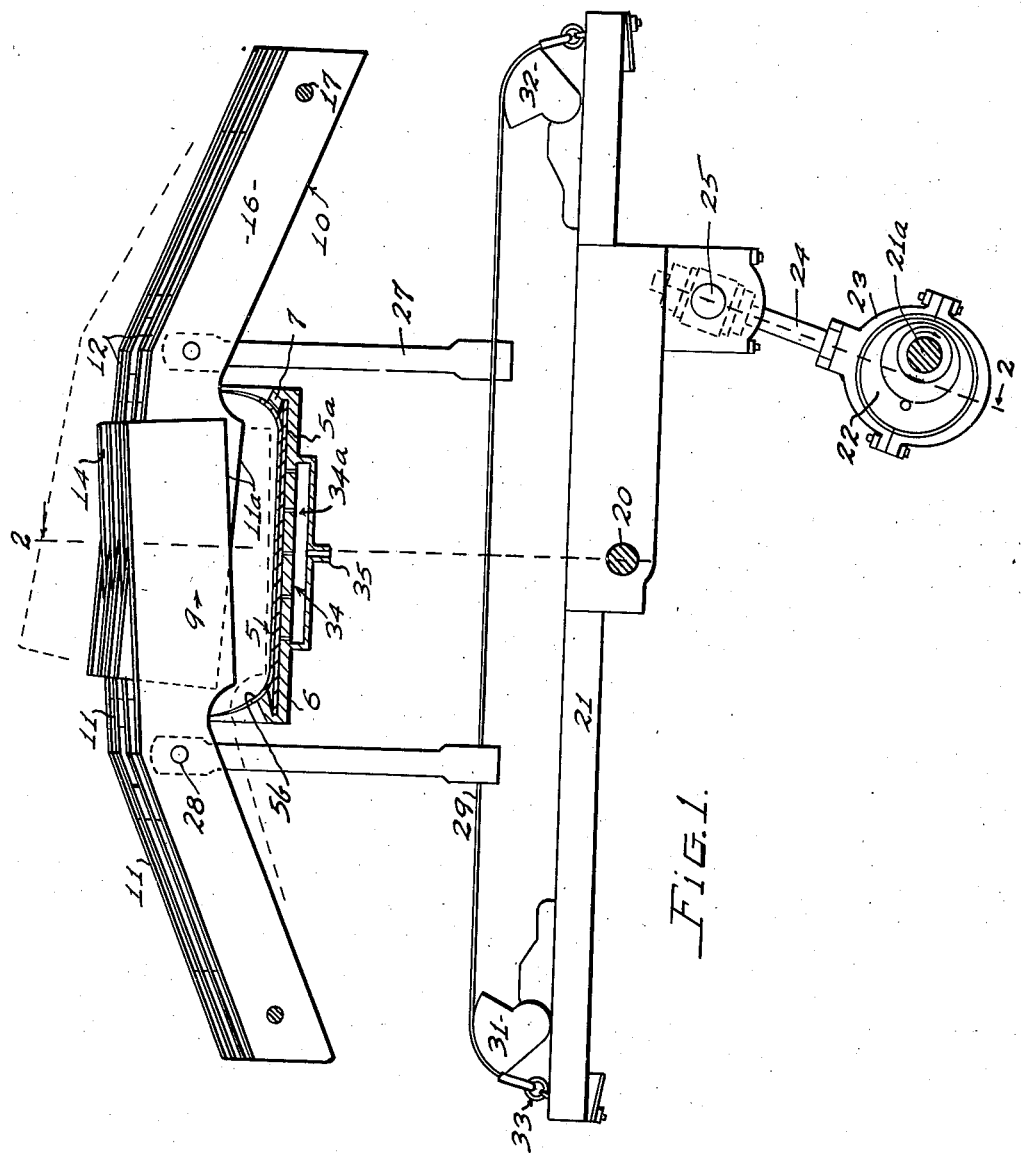

In carrying out my invention I provide a traveling conveyor or belt such as indicated at 5 and this is moved at suitable rate in one direction as is well understood in this art. While any conventional belt may be used in the manner well understood in the art, this belt is shown as moving over a platen 6 which at points to either side of the area where beating is to take place, is provided with suitably spaced risers or elevated surfaces, indicated at 7, so that at the beating area the belt takes on a water-retaining dish form while at other points the belt is free to assume the usual flat disposition whereby water can drain therefrom at all points except where beating is to take place. Directly over the beating area of the platen there is provided a water supply pipe 8 disposed to slowly flow water over the beating area and over the fibers undergoing beating action.

The beating elements are arranged in pairs, the two beating elements being indicated at 9 and 10 respectively in Figures 1 and 2, which drawings are confined to a pair and to the means for actuating same.

A full description of one such element will suffice since they are identical except that element 9 is at one side of the belt and element 10 is disposed at the other side, and means about to be described are provided for moving the elements alternately so that one is descending while the other is ascending. A beater element consists of a plurality of spaced paddles 11, 11, etc., joined in spaced relationship as by blocks or spacer elements 12, 12, to all move simultaneously. These paddles are disposed with their lower edges such as 11a, disposed to strike the belt or material carried by the belt, and it will be seen hereinafter that they may be caused to invariably strike a suitable blow regardless of the amount of material usually disposed on the belt. Each beater extends from the corresponding side of the belt well over toward the other side; the paddles of one element operating in the spaces 14 provided between the paddles of the other element and vice-versa. Thus a pair of opposed elements acts at all times to constrain the fibers from leaving the belt vertically and as an ascending element may act to lift some of the fibers, or as the mass of fibers tend to raise at the end of a blow, the paddles of the other element immediately force the fibers toward the belt.

Each beater is extended as at 16 away from the belt to form a shank which descends slightly and is fitted with a transverse shaft 17; the shaft being arranged with its axis approximately paralleling the path of travel of the belt. The shaft provides for the beater element being rapidly oscillated in a fixed plane. Preferably this shaft is inclined upwardly forwardly in the direction of travel of the belt so that as the paddles descend toward the belt they travel slightly forwardly and strike the belt or its contents with a slight forward urge. Actually it is found that this urge may be sufficient to propel the belt as required altho this action is not depended upon for driving the belt. This peculiar motion of the part of the paddles provides that the belt may be positively driven without the fibers thereon being retarded by the paddles, whereas without this provision the fibers would be held stationary momentarily at each blow in such manner that the fibers might tend to lag and build up too great a mass under the paddles, or become increasingly entangled. While the feature has advantages in either long or short fiber treatment, it is particularly beneficial in the treatment of the relatively long and relatively straight Yucca fibers.

I have found that improved results are attained with some materials and under some conditions if the complete machine shown in Figure 3 is adjusted so that certain beater elements oscillate more rapidly than others or have an individual stroke peculiar to the conditions and such is one object of the invention and an advantage gained by having the multiplicity of beaters shown in Figure 3.

Also, altho it is not essential to the operativeness of the machine, this shaft is shown as located slightly below the plane of the belt so that as the fibers are struck the paddle edges are found to be moving slightly inwardly with respect to the center of the belt, and this peculiar motion at the instant of each blow tends to keep the fibers in a collected mass and does not tend to drive the fibers toward or over the edges of the belt.

Since the axis of oscillation of each beater element is inclined, and since this axis extends along a plane just below the plane of the belt, the beater element as a whole has a rather peculiar geometric form as will be seen from the drawings and well understood by those skilled in the mechanical arts. Specifically, while the beater element works on an inclined axis the striking edges of the paddles are disposed on a common horizontal plane corresponding to the horizontal plane of the belt. It is the fact that all paddle edges strike simultaneously while moving with a slight forward motion due to the inclined axis of oscillation, which accounts for their progressive action in striking the fibers.

Centrally under the belt and platen there is provided a pivot shaft 20 on which is pivoted an oscillating member 21 known hereinafter as the bow. This bow is preferably of suitably selected seasoned lumber of a type suitable to the present duties and is elongated transversely of the machine. Metal may be used. It is oscillated with respect to and about its shaft 20 thru the medium of a drive shaft 21a, an adjustable eccentric 22, an eccentric strap 23 fitted around the eccentric 22, and a pitman or crank 24 integral with the strap 23 and connected to the bow by a wrist-pin 25. Rotation of the drive shaft acts in the manner common to reciprocating machines to oscillate this bow so that one extreme end ascends as the other descends, and vice-versa. Power shaft 21a, wrist-pin 25 and pivot shaft 20 are all inclined at the same angle and in the same direction as the pivot shafts of the beater elements. In fact, with respect to the horizontal plane on which the belt moves all other parts of the machine are inclined in conformity with the inclination predetermined in connection with the pivots of the beater elements.

At a slightly spaced distance from each side of the belt, each beater element is provided with a depending arm 27, each arm being pivoted to its beater as at 28. These arms are alternately reciprocated by the bow but instead of being attached to this bow in the manner normally to be expected in the art of reciprocating machines, each arm is attached at the lower end to a corresponding cable; the numeral 29 indicating the cable for one arm and the numeral 30 indicating the cable to which the other arm is attached.

The bow is provided near each end with a bridge 31 and 32 respectively over which the cables are stretched. The ends of the cables are adjustably secured to the bow as by the fittings 33 which provide that the cables may be securely tensioned.

In fact relatively heavy braided or twisted wire cables are employed and the combined pull to which these cables are initially subject may be in the order of several hundred pounds. The bow is of such timber as to withstand moisture conditions and still exert a constant pull of many hundreds of pounds on the cables.

It will be understood that all of the shafts and pivots described are fixed relative to one another by a suitable frame forming part of the complete machine. To avoid confusion of lines in the drawings this frame is not shown but it will be understood that all parts not described specifically as undergoing reciprocating or oscillating motion are held in position by a suitable frame. The platen on which the belt travels is here shown as of hollow section as at 34 and provided with lubrication openings 34a and an inlet pipe 35 which provides for feeding water between the belt and platen. Also altho the machine is not limited to a given belt the belt is shown as consisting of two pieces 5a and 5b; the one piece 5a remaining flat and taking the driving strain while the upper piece 5b is disposed to ride over the risers and to raise and lower and otherwise conform thereto as required. While suitably flexible material will allow for the belt rising and falling as required, otherwise suitable rollers may be employed at the edges.

In operation and presumably while the belt is progressing in the proper direction and while fiber is being carried along thereby and subject to a slight flow of water from the supply pipe 8, the drive shaft 21 is rotated at suitable rotative speed.

The eccentric cam driven by this shaft imparts corresponding reciprocal action to the bow and its cables and this motion is transmitted thru the cables to the arms 27 and the beaters. The action of the cables imparts a peculiarly effective whipping action to the beaters. Actually by reason of flexing of the cables the beaters undergo a longer stroke than would be expected by a comparison with the length of stroke at the points along the bow corresponding to the position of the arms 27. Thus when a beater element is raised by lifting of the corresponding end of the bow, its inertia and the flexing of the corresponding cable permit this beater to overreach its stroke or to travel farther than it would were the rate of reciprocation of the bow to be extremely slow. Even before a beater element has completed its upward stroke the corresponding end of the bow has actually begun its descent. Likewise when the beater moves toward the belt or actually strikes the fibers being carried by the belt, the corresponding end of the bow may have begun its upward stroke and the paddle edges are caused to strike a very effective but never-the-less non-positive blow or whipping action which is peculiarly effective but not destructive. It will be found for a given type of fiber, and a given rate of speed, and a given tensioning of the bow cables, and a given length of bow stroke as determined by the adjustable eccentric, that there is a reciprocal speed which produces a properly synchronized harmonic motion on the part of the paddles and the fiber may be subjected to the action of thousands of paddle-edge-blows per minute without the blows of the paddle edges being severe or destructive. In fact the entire action upon the fibers may be simply described as being unexpectedly effective and efficient without the action being positive in the sense usually associated with reciprocal beaters. To make a homely comparison between this beater and other machines in the art is to say that this machine excels over more positive actioned beaters in the same way that a good whip or flexible instrument excels over a stiff board as a means for beating carpets. Obviously the machine illustrated and described, and various modifications thereof, may be applied to many other beating operations.

I find that where this machine is used with a limited amount of the water, the prior treatment of the leaves need consist only of some "cooking" or like action such as will change the differential between fiber structure and cell structure so that the effective but non-positive action of the beaters results in the plant cells and saponin, sugar and the like being thoroughly removed from the fibers and the fibers separated and agitated to a degree that when dried they are ready for final fabrication into the forms in which they appear on the market. Again certain plant products may be had in such condition that this machine alone will act to remove and suitably cleanse the fibers.

To provide a large production unit several of the assemblies of beater elements and bow-string drives are arranged successively along the belt as shown in Figure 3. Thus the one end of a drive shaft of one assembly is disposed below the other end of the drive shaft of an adjacent assembly. Despite the use of several inclined shafts in connection with a relatively horizontal belt, I have designed each assembly so that the shafts are driven one by the other thru spur-gear units 40, each correspondingly inclined.

Several beater units so combined provide for large production and corresponding increase of belt speed. The several units so combined produces, not merely an aggregation, but rather a complete production machine which provides that new material is first beaten and washed with water, some sapoin and plant cells removed by water draining from the belt, before the fibers are beaten additionally. This successive wet beating with intermediate flushing with water is particularly important in treating Yucca.

In the foregoing I have been specific as to construction, arrangement of parts, method of operation, materials to be treated, etc., while it will be understood that such is only by way of making a practical disclosure and shall not act to limit the scope of the invention and I may employ other constructions, arrangements of parts, methods of operation, etc., within the scope of the appended claims.

I claim:

1. In a machine of the class described, a conveyor belt adapted for moving long fibers generally longitudinally along a horizontal plane, reciprocal beater members immediately above and transverse to said plane, means for reciprocating said beater members in a plane generally normal to said conveyor, and means associated with said conveyor in the immediate area of said beater members for causing said conveyor to there retain water; said conveyor acting at other areas to promote drainage of water therefrom.

2. In a machine of the class described, a horizontal elongated platen, approximately vertically reciprocal beater members disposed immediately above and transverse to said platen, a flexible conveyor belt movable longitudinally of said platen, and spaced risers at each edge of said platen co-acting with said flexible conveyor belt to retain water on said belt immediately under said beater members.

3. The machine as in claim 1 and in which the beater members are arranged in pairs opposed transversely of the belt with each pair disposed to strike the mass while undergoing slight movement toward the center of the belt.

4. The machine as in claim 2 and in which the beater members are arranged in pairs opposed transversely of the belt with each pair disposed to strike the mass while undergoing slight movement toward the center of the belt.

5. In a fiber beater, a horizontal fixed platen, a conveyor belt movable longitudinally over the upper surface of said platen, a frame supporting said platen, a pair of opposed pivot shafts one at each side of said platen, and approximately parallel thereto; a pair of opposed beater members one for and pivoted on each pivot shaft and each having a free end projecting from the corresponding pivot shaft laterally above the platen, each beater member consisting of a plurality of spaced paddles providing corresponding intermediate spaces into each of which a corresponding paddle of the other beater member extends; an oscillating beam extending transversely under said platen and provided with a rocker shaft approximately parallel to the longitudinal axis of said platen, a pair of parallel cables stretched across said beam and held thereby at respective ends under sufficient tension to slightly bow said beam, a pitman connected at one end to one of said cables adjacent one end of the beam and connected at the other end to one of said beater members, a second pitman connected at one end to the other cable adjacent the other end of said beam and connected at the other end to the other beater member, and means for oscillating said beam at a speed sufficient to cause each beater member to whip beyond the normal limit of the downward stroke to thereby strike the belt or fibers conveyed thereby.

6. The beater as in claim 5 and further including means for feeding water to said belt over said beater members, said belt having flexible side edges and said platen providing risers in the vicinity of said beater member to there lift the side edges of the belt to there retain water.

7. The beater as in claim 5 and in which said pivot shafts are disposed below the plane of said belt whereby the beater members strike the belt with an inward movement urging fibers toward the center of the belt.

8. The beater as in claim 5 and in which said pivot shafts are inclined upwardly in the direction of travel of said belt.

RAYMOND G. OSBORNE.